UNITED STATES PATENT OFFICE 2,042,019

PROCESS OF PREPARING THE REACTION PRODUCT OF HYDRATED ALUMINUM OXIDE AND GLUCONIC ACID

Richard Pasternack, Brooklyn, and William Ralph Giles, Richmond Hill, N. Y., assignors to Charles Pfizer & Company, Brooklyn, N. Y., a corporation of New Jersey No Drawing. Application July 28, 1931, Serial No. 553,682

8 Claims. (Cl. 260—11)

The object of this invention is the preparation of the reaction product of hydrated aluminum oxide and gluconic acid.

Metallic aluminum does not dissolve to any extent in gluconic acid solution. It has been proposed to prepare aluminum gluconic acid compositions, but so far as we are aware such processes are unsatisfactory because of the impossibility of removing by-products, such as sulfates, which in some cases are objectionable in compositions of this class, and also because of the presence of other objectionable substances.

We have discovered that satisfactory solutions and dry compounds whose aluminum content may be varied as desired within certain limits, can be made by combining hydrated aluminum oxide with gluconic acid solution, the resulting solution being useful for certain purposes, and yielding a novel dry product upon simple evaporation. Such compositions, whether in solution or dry, are stable, and do not precipitate aluminum hydroxide on drying, or on addition of ammonia or soda ash, and the dry product obtained by evaporation readily redissolves to form stable aluminum gluconic acid solutions.

We have found that best results are secured when the hydrated aluminum oxide is freshly prepared, and disclose herein several methods therefor which have been found satisfactory and which do not contaminate or impair the end product.

Inasmuch as aluminum amalgam is a reducing agent for lactones of the sugar group, it would be expected that this material would reduce gluconic acid to glucose or sorbitol. We have found that this reduction of gluconic acid in solution does not occur to any appreciable extent, but that the amalgam reacts with water present to form hydrated aluminum oxide according to the equation.

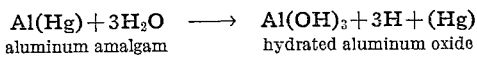

$$Al(Hg) + 3H_2O \longrightarrow Al(OH)_3 + 3H + (Hg)$$
aluminum amalgam        hydrated aluminum oxide The hydrated aluminum oxide dissolves in the gluconic acid, forming a stable composition which does not precipitate aluminum hydroxide either on evaporation and drying, or on addition of ammonia or soda ash, and a stable solution, or a dry readily soluble aluminum gluconic acid composition can be thereby obtained.

The solutions and dry products of this invention can be made either from the solutions in which gluconic acid is formed, as by fermentation or electrolysis of glucose, or from gluconic acid, as will now be described in several examples.

Example I

A quantity of liquor prepared by fermentation of glucose by means of acetobacter, or by electrolytic oxidation of glucose in aqueous solution containing about 136.5 lb. gluconic acid and not more than 7 lbs. soluble carbohydrates, is concentrated to 25° Bé. To this is added 13.5 lb. of sheet aluminum, previously cut up into small pieces, washed with 10% caustic and rinsed with cold water. Then 1 lb. mercuric gluconate is dissolved in 1 quart water and added to the mixture.

The mercury precipitates on the aluminum, forming an amalgam. This, in turn, reacts with the water to form hydrated aluminum oxide, which is immediately dissolved by the gluconic acid. The reaction is started by warming the mixture to 40–60° C. Usually the reaction produces sufficient heat to maintain this temperature until all the aluminum has dissolved. If necessary, outside heat is supplied. After the aluminum has dissolved, the solution is filtered and evaporated to 35° Bé. It contains about 25.5 lb. $Al_2O_3$ and small amounts of soluble carbohydrates. This solution is suitable for many purposes as tanning, waterproofing, etc. Upon evaporation or by spray drying as hereinafter described, it will yield about 150 lbs. of dry soluble aluminum gluconic acid composition.

Example II 3 pounds of metallic aluminum, preferably in the form of chips, shavings, foil, or other shapes presenting relatively large reaction surfaces, are washed with a 10% caustic soda solution and rinsed clean. The aluminum is then treated with .06 to .13 pounds of mercuric chloride in the form of a .5% aqueous solution to amalgamate the surface. After rinsing off the excess mercuric chloride, an aqueous solution containing 20 pounds of gluconic acid, calculated as 100% acid, is added. Solution of the aluminum may be hastened by heating. The mercury is left as a finely divided suspension, and along with silicon and other insoluble impurities, is readily removed by filtration.

The solution may be used as such, or concentrated, or evaporated to dryness on a tray or trays at a temperature of 90° C. which is gradually reduced to 50° C. before it becomes completely dry. The final stages of the evaporation are carried out at the reduced temperature of 50° C., as above that temperature the product has a tendency to darken, due to decomposition of the traces of sugar present. The solution may also be spray dried in air at or below 150° C., so as to hold the temperature of the product at about 50° C.

The dry product contains approximately 24% $Al_2O_3$ and is readily soluble in water. The solution becomes viscous with high concentration, but shows no tendency to precipitate. A product containing a lower percentage of aluminum may be made by reducing the amount of aluminum used. The aluminum used is preferably of high purity, although reasonable amounts of silicon are harmless as they are removed in the process. Metallic impurities, especially copper and iron, are very objectionable; copper interferes with the proper amalgamation of the aluminum, while iron is objectionable on account of color, taste, etc.

Reduction of the gluconic acid occurs only to a very slight extent, and the resulting mixture contains not over one per cent of sugar.

The mercury does not go into solution but simply catalyzes the reaction.

*Example III*

The solution as prepared in Example II is evaporated to dryness by spray drying in air at about 150° C., the product however being at about 50° C. The product formed is the same is in Example II.

The spray drying may be carried out at any temperature which will not darken the product. The permissible air temperature naturally varies with the rapidity of the drying.

*Example IV*

Hydrated aluminum oxide equivalent to 51 grams of $Al_2O_3$, and prepared, for instance, by precipitation of a soluble aluminum salt with excess of $NH_4OH$, is washed free of soluble substances, for instance by decantation, and then suspended in one liter of distilled water containing 232 g. of gluconic acid. This mixture is heated on a water bath for about 100 hours, the volume of the water in the bath being maintained by any suitable means, and the mixture is then evaporated to dryness as in Example II or III. The product is an especially pure aluminum gluconic acid composition, substantially free of impurities, and contains 18% $Al_2O_3$.

*Example V*

One gram molecule of aluminum chloride is dissolved in one liter of water, and three gram molecules of sodium gluconate are added. The solution is evaporated to dryness and the product obtained is similar in appearance to that in Example II or III. It is suitable for therapeutic use, as the only by-product of reaction is sodium chloride.

A higher drying temperature can be used in Examples IV and V than in Examples II and III, because of the absence of sugars.

Our product has astringent properties, and when dry is a white amorphous powder, free of sulfates, readily soluble in water and forms stable solutions. The aluminum is not precipitated by ammonia nor alkali hydroxides, or carbonates, nor can any precipitate be obtained by saturating the solution with sodium chloride.

Our product is suitable for therapeutic use, tanning, especially for white leathers, and also has a remarkable capacity for withdrawing small amounts of iron compounds from physical or chemical combinations. A product made from aluminum of high purity will withdraw iron, for instance, from ordinary bone black.

It is to be understood that this invention is not to be limited to any particular method of forming the hydrated aluminum oxide, nor the aluminum amalgam, nor to any specified weights of reacting materials, nor to any particular method of evaporating the solution; but we claim broadly the preparation of a stable aluminum gluconic acid solution from hydrated aluminum oxide, and the resulting stable product obtained by simple evaporation or spray drying, which can be redissolved to form a stable solution.

We claim:

1. The process of preparing reaction product of hydrated aluminum oxide and gluconic acid comprising reacting freshly prepared hydrated aluminum oxide and gluconic acid in water.

2. The process of preparing reaction product of hydrated aluminum oxide and gluconic acid comprising reacting freshly prepared hydrated aluminum oxide and gluconic acid in water, and evaporating the solution to dryness.

3. The process of preparing reaction product of hydrated aluminum oxide and gluconic acid comprising forming hydrated aluminum oxide, and reacting such freshly formed hydrated aluminum oxide and gluconic acid to form reaction product of hydrated aluminum oxide and gluconic acid in solution.

4. The process of preparing reaction product of hydrated aluminum oxide and gluconic acid comprising reacting freshly prepared hydrated aluminum oxide and gluconic acid in water, heating the solution for about 100 hours, and evaporating the solution to dryness.

5. The process of preparing reaction product of hydrated aluminum oxide and gluconic acid comprising precipitating hydrated aluminum oxide and adding gluconic acid to the freshly prepared precipitate.

6. The process of preparing reaction product of hydrated aluminum oxide and gluconic acid comprising precipitating hydrated aluminum oxide, adding gluconic acid solution to the freshly prepared precipitate and recovering the product by evaporating the solution.

7. The process consisting in forming gluconic acid in aqueous solution, and reacting such solution with freshly prepared hydrated aluminum oxide.

8. The process consisting in forming gluconic acid in aqueous solution, reacting such solution with freshly prepared hydrated aluminum oxide, and drying the solution to recover reaction product of hydrated aluminum oxide and gluconic acid.

RICHARD PASTERNACK.
WILLIAM RALPH GILES.